(12) United States Patent
Nakayama et al.

(10) Patent No.: US 11,943,408 B2
(45) Date of Patent: Mar. 26, 2024

(54) PRINTING APPARATUS

(71) Applicant: Brother Kogyo Kabushiki Kaisha, Nagoya (JP)

(72) Inventors: Rui Nakayama, Gifu (JP); Noriaki Kishimoto, Niwa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/160,333

(22) Filed: Jan. 27, 2023

(65) Prior Publication Data

US 2023/0247156 A1 Aug. 3, 2023

(30) Foreign Application Priority Data

Jan. 31, 2022 (JP) .................................. 2022-013344

(51) Int. Cl.
*H04N 1/00* (2006.01)

(52) U.S. Cl.
CPC ....... *H04N 1/00822* (2013.01); *H04N 1/0044* (2013.01); *H04N 1/00602* (2013.01); *H04N 1/00689* (2013.01)

(58) Field of Classification Search
CPC .... G06F 3/1205; G06F 3/1208; G06F 3/1256; G06F 3/1285; H04N 1/00411; H04N 1/00442; H04N 1/00448; H04N 1/00456; H04N 1/00458; H04N 1/00461; H04N 1/00466; H04N 1/00474; H04N 1/00482
USPC ........................................................ 358/1.15
See application file for complete search history.

(56) References Cited

U.S. PATENT DOCUMENTS

| | | | | |
|---|---|---|---|---|
| 6,281,983 | B1 * | 8/2001 | Takahashi | H04N 1/2338 358/452 |
| 7,154,630 | B1 * | 12/2006 | Nimura | H04N 1/00175 358/1.18 |
| 7,643,187 | B2 * | 1/2010 | Tagawa | G03G 15/502 358/1.14 |
| 8,559,034 | B2 * | 10/2013 | Mori | H04N 1/0044 358/1.15 |
| 8,724,158 | B2 * | 5/2014 | Nara | H04N 1/00567 715/204 |
| 2004/0161257 | A1 * | 8/2004 | Ishihara | G06K 15/00 399/81 |
| 2010/0107064 | A1 * | 4/2010 | Yamaguchi | G06F 40/106 715/274 |

(Continued)

FOREIGN PATENT DOCUMENTS

| | | |
|---|---|---|
| JP | 2010-093661 A | 4/2010 |
| JP | 2010-118762 A | 5/2010 |

*Primary Examiner* — Negussie Worku
(74) *Attorney, Agent, or Firm* — KENEALY VAIDYA LLP

(57) ABSTRACT

A controller of a printing apparatus performs first image reading including conveying a necessary number of original documents for printing on one sheet, reading an image on the conveyed original documents and terminating conveyance of the original documents. Further the controller performs displaying of a preview image and second image reading including conveying an original documents subsequent to the original documents in response to receipt of a print instruction through the user interface, and reading an image on the conveyed original documents with the sensor assembly, and printing the read images read on the sheets.

7 Claims, 12 Drawing Sheets

(56) References Cited

U.S. PATENT DOCUMENTS

| | | | | |
|---|---|---|---|---|
| 2010/0118338 | A1* | 5/2010 | Sakiyama | G06F 3/1256 358/1.15 |
| 2010/0309499 | A1* | 12/2010 | Ebi | G06F 3/1257 358/1.13 |
| 2012/0204173 | A1* | 8/2012 | Liu | G06F 9/44505 718/1 |
| 2016/0198052 | A1* | 7/2016 | Shogaki | H04N 1/00392 358/1.15 |
| 2017/0168763 | A1* | 6/2017 | Ohshima | G06F 3/04842 |
| 2018/0267750 | A1* | 9/2018 | Kobayashi | G06F 3/1205 |
| 2019/0306339 | A1* | 10/2019 | Nishida | G03G 15/5062 |
| 2020/0149589 | A1* | 5/2020 | Sato | F16J 15/3264 |

* cited by examiner

PRINTING APPARATUS

REFERENCE TO RELATED APPLICATIONS

This application claims priority from Japanese Patent Application No. 2022-013344 filed on Jan. 31, 2022. The entire content of the priority application is incorporated herein by reference.

BACKGROUND ART

The present disclosures relate to a printing apparatus equipped with a sensor assembly.

There has been known an image forming apparatus having a preview function to display a preview image before performing a copying operation. Typically, such a conventional image forming apparatus is configured such that multiple sheets of original document are read (scanned) with an ADF (automatic document feeder), image data representing the scanned original document is stored in a storage of the image forming apparatus, and an image of the top of the multiple sheets of the original document is displayed as a preview image.

DESCRIPTION

According to the conventional image forming apparatus described above, the reading of the multiple sheets of the original document with the ADF cannot be terminated in the middle of the reading, it will take a long time if the reading of the original document is to be performed again.

According to aspects of the present disclosure, there is provided a printing apparatus, comprising an original document tray on which original documents are to be placed, a sensor assembly configured to read an image of the original documents, an original document conveyer having a sheet conveying roller configured to convey the original documents placed on the original document tray toward the sensor assembly, a printing engine configured to print an image read by the reading device on a sheet, a display, a user interface, and a controller. The controller is configured to perform first image reading, preview displaying, second image reading, and printing. The first image reading includes conveying, with the original document conveyer, a necessary number of original documents for printing on one sheet from the original document tray to the sensor assembly, reading images on the conveyed original documents with the reading device, and terminating conveyance of the original documents with the original document conveyer. The preview displaying includes generating a preview image showing a state where the image read by the sensor assembly in the first image reading is printed on the sheet, and displaying the preview image on the display. The second image reading is performed in response to receipt of a print instruction through the user interface after executing the preview displaying. The second image reading included conveying an original document subsequent to the original documents read in the first reading, and reading an image on the conveyed original document with the sensor assembly. The printing is printing the images read, in the first image reading and in the second image reading, by the sensor assembly on the sheets with the printing engine.

Figure 1:
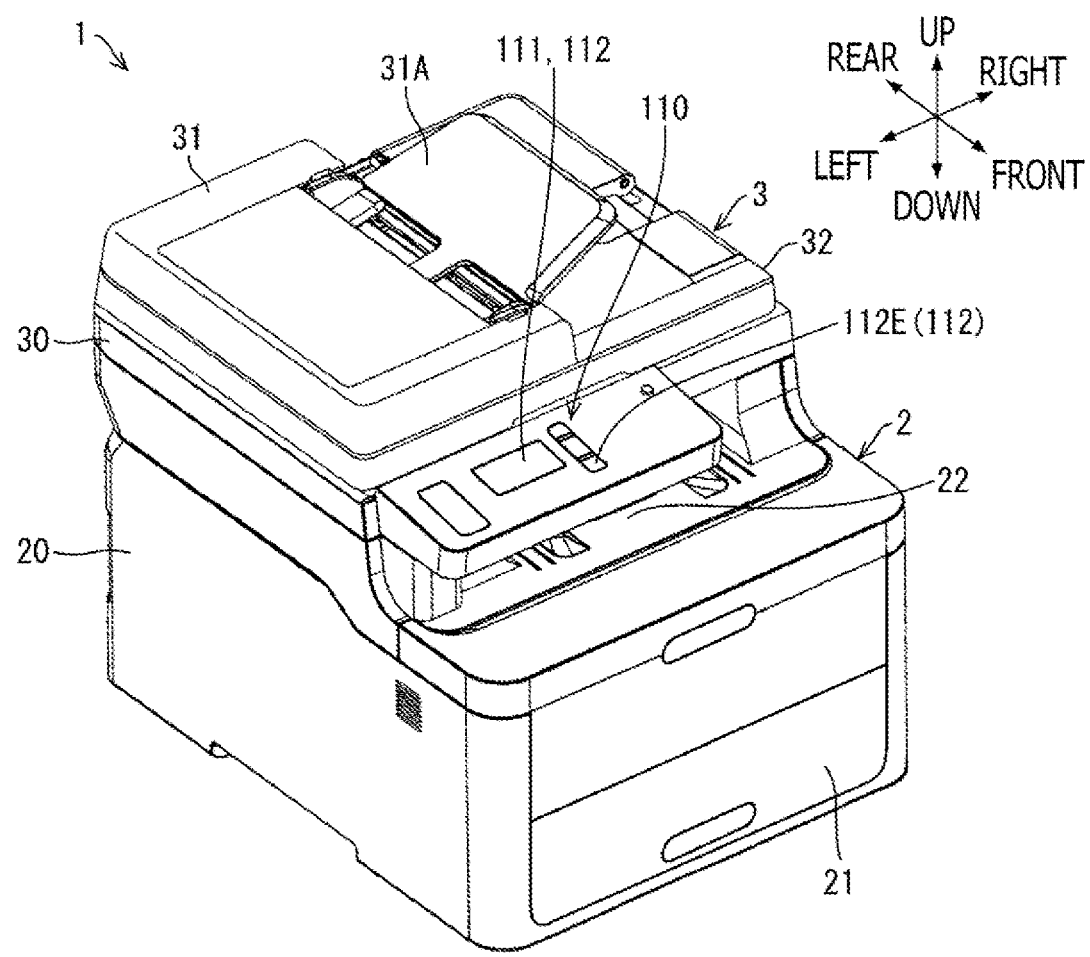
FIG. 1 is a perspective view of an MFP (multi-function peripheral) according to an embodiment of the present disclosures.

Hereinafter, referring to FIGS. 1-7, an MFP 1 according to an embodiment of the present disclosures will be described. FIG. 1 is a perspective view showing an appearance of the MFP 1. The MFP 1 is an example of a printing apparatus, and has a printing function, a copying function, a scanning function, and a facsimile function. It is noted that the printing apparatus does not need to have all the functions above, and the MFP may not have, for example, the facsimile function. In the following description, an up-down direction, a front-rear direction, and a right-left direction of the MFP 1 defined as indicated in FIG. 1 will be referred to.

The MFP 1 has a printer 2 and a scanner 3. The printer 2 has an electrophotographic printing function to form an image on a sheet P. The scanner 3 has a scanning function to read an image on an original document M and generate image data (hereinafter, referred to as scan data) representing a read image (hereinafter, referred to as a scanned image).

It is noted that a printing method of the printer 2 is not necessarily limited to the electrophotographic method, but an inkjet method, for example. The printer 2 may be configured to print color and monochrome images, or only monochrome images. Further, the scanner 3 may be configured to scan color and monochrome images, or only monochrome images.

A display 111 and a user interface 112 are provided to an operation panel 110 arranged on a front side of the MFP 1. The display 11 is configured as a touch panel having a liquid crystal display and a transparent touch screen, and an operation screen of the MFP 1, a preview image and the like are displayed on the display 111.

In detail, as shown in FIG. 6, operation keys such as a print setting key 112A, a preview key 112P1, an all page preview key 112P2, a setting change key 112Q, a start key 112B, a start key 112C, a start key 112D, a return key 112F, and a forward key 112G are displayable on the display 111. The key group such as the print setting key 112A displayed on the touch panel constitutes a part of the user interface 112. The user interface 112 has a cancel button 112E as a physical key. Instead of the cancel button 112E, a cancel key may be displayed on the touch panel.

A configuration of the printer 2 will be described with reference to FIGS. 1 and 2. As shown in FIG. 1, the printer 2 has a casing 20. In a bottom part of the casing 20, a sheet feed tray 21 is arranged so as to be movable in the front-rear direction. The sheet feed tray 21 is configured to support a plurality of sheets P in a stacked manner. On an upper part of the casing 20, a sheet discharge tray 22 is formed. The sheet discharge tray 22 is configured to support the sheets P on which images have been printed. The sheets P are, for example, A4 size (i.e., 210 mm×297 mm) normal sheets. It is noted that the number of sheet feed trays 21 may be changed as needed.

Figure 2:
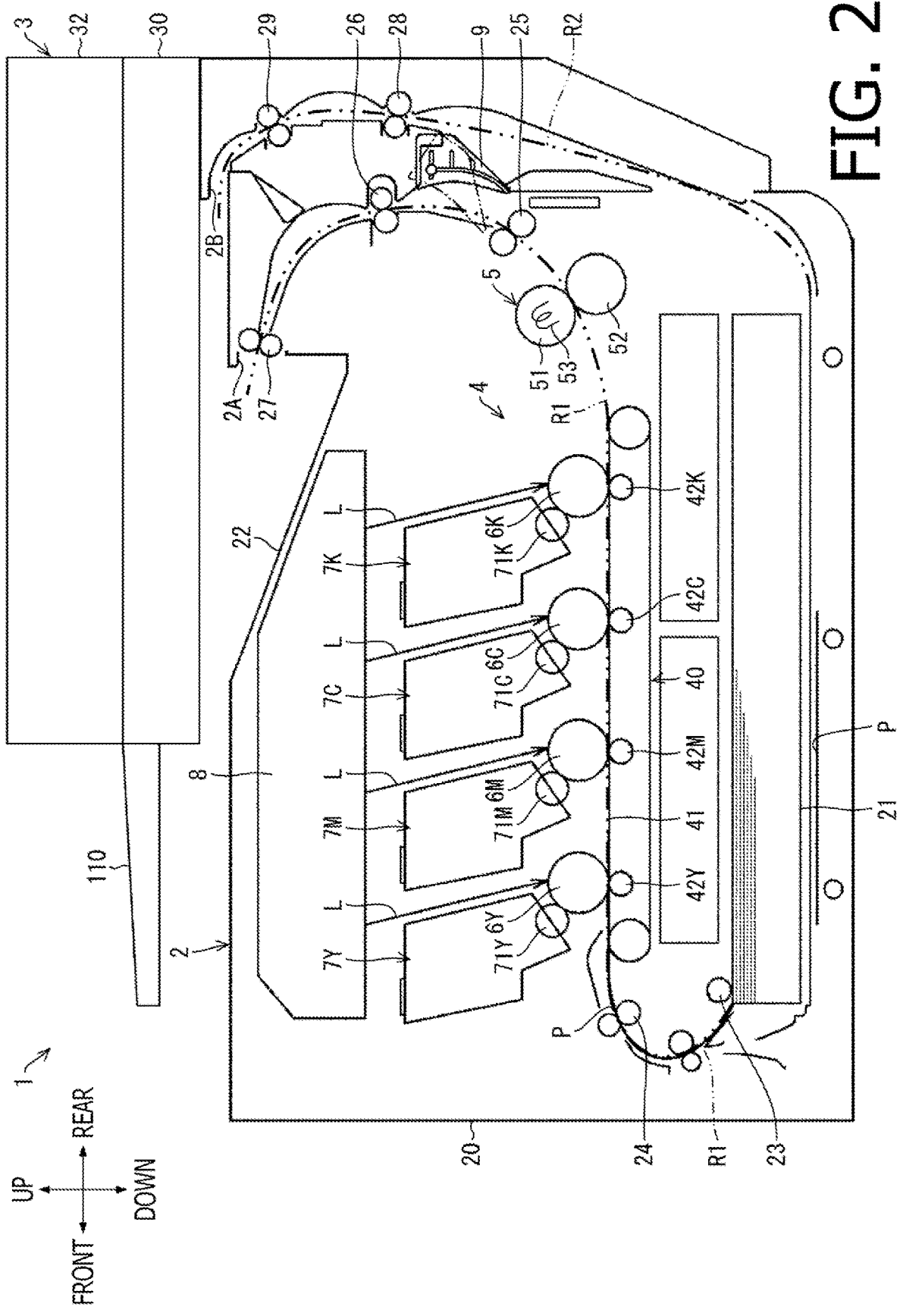
FIG. 2 is a cross-sectional side view showing an internal configuration of a printer of the MFP.

FIG. 2 is a cross-sectional side view of the printer 2 of the MFP 1 and shows an inner configuration thereof. As shown in FIG. 2, inside the printer 2, a sheet feed roller 23, a conveying passage R1, a registration roller pair 24, a printing engine 4, a fixing device 5, a conveying roller pair 25 and 26, an discharging roller pair 27, a re-conveying passage R2 and reversing roller pairs 28 and 29 are provided.

The sheet feed roller 23 is provided to the sheet feed tray 21, and is configured to feed the sheets P accommodated in the sheet feed tray 21 to the conveying passage R1 one by one. The conveying passage R1 is a passage extending from the sheet feed tray 21 to the sheet discharge tray 22 via photosensitive drums 6Y, 6M, 6C and 6K, the fixing device 5, and an discharge opening 2A.

The sheet feed roller 23, the registration roller pair 24, the conveying roller pairs 25 and 26, the discharging roller pair 27, and the reversing roller pairs 28, and 29, are roller groups configured to convey the sheet P along the conveying passage R1 or the conveying passage R2. The registration roller pair 24 is configured to align the leading edge of the sheet P and then convey the sheet P toward the photosensitive drum 6Y.

The printing engine 4 has a transferring device 40, the four photosensitive drums 6Y, 6M, 6C and 6K, four developing devices 7Y, 7M, 7C and 7K, and an exposure device 8. The four photosensitive drums 6Y, 6M, 6C and 6K respectively correspond to four colors of yellow (Y), magenta (M), cyan (C) and black (K), and are arranged from an upstream side to a downstream side, in the conveying direction of the sheet P, in this order with certain intervals, in the front-rear direction, therebetween. The photosensitive drums 6Y, 6M, 6C and 6K are driven, by a well-known driving motor, to rotate. It is noted that the arranging order of the photosensitive drums 6Y, 6M, 6C and 6K is not necessarily limited to the above, and can be changed as needed.

A circumferential surface of each of the photosensitive drums 6Y, 6M, 6C and 6K is uniformly charged by a well-known charger. Above the photosensitive drums 6Y, 6M, 6C and 6K, four developing devices 7Y, 7M, 7C and 7K are arranged, respectively. The developing devices 7Y, 7M, 7C and 7K accommodate toners having colors corresponding to the respective colors (i.e., yellow, magenta, cyan, and black). At lower rear end portions of the developing device 7Y, 7M, 7C and 7K, developing rollers 71Y, 71M, 71C and 71K are arranged, respectively.

Above the four developing devices 7Y, 7M, 7C and 7K, the exposure device 8 is arranged. The exposure device 8 is configured to expose the photosensitive drums 6Y, 6M, 6C and 6K by emitting a laser beam L thereto based on the image data. In this way, electrostatic latent images based on the image data representing images to be formed on the sheet P are formed on the photosensitive drums 6Y, 6M, 6C and 6K.

The four developing rollers 71Y, 71M, 71C and 71K supply the toner to the photosensitive drums 6Y, 6M, 6C and 6K, respectively. Then, the electrostatic latent images formed on the photosensitive drums 6Y, 6M, 6C and 6K become developer images (i.e., toner images), respectively.

Below the four photosensitive drums 6Y, 6M, 6C and 6K, the transferring device 40 is arranged extending in the front-rear direction. The transferring device 40 has an endless belt 41 and four transfer rollers 42Y, 42M, 42C and 42K. As the endless belt 41 is moved around, an upper surface of the endless belt 41 moves from the front side to the rear side with contacting the four photosensitive drums 6Y, 6M, 6C and 6K.

The four transfer rollers 42Y, 42M, 42C and 42K are arranged in the front-rear direction with certain intervals therebetween. The transfer rollers 42Y, 42M, 42C and 42K are arranged below the photosensitive drums 6Y, 6M, 6C and 6K, respectively, with the endless belt 41 nipped therebetween.

The fixing device 5 is arranged on a rear side with respect to the transferring device 40, the fixing device 5 includes a heat roller 51 that includes a heater 53 and a pressure roller 52. The heater 53 includes, for example, a halogen heater. The heater 53 is configured to heat the sheet P via the heat roller 51. The fixing device 5 is configured to fix a developer image on the sheet P by applying heat and pressure with the heat roller 51 and the pressure roller 52.

The conveying roller pair 25 is arranged on the downstream side, along the conveying passage R1, from the fixing device 5, and is configured to convey the sheet P toward the conveying roller pair 26. The conveying roller pair 26 is configured to convey the sheet toward the discharging roller pair 27. The discharging roller pair 27 is configured to discharge the sheet P onto the sheet discharge tray 22.

The re-conveying passage R2 is a passage along which the sheet P with an image printed on one side is conveyed toward the passage opening 2B via a flap 9, then the conveyance direction of the sheet P is reversed by the reversing roller pairs 28 and 29 and conveyed downward, and supplied to the conveying passage R1 from a lower part of the sheet feed tray 21.

The flap 9 is arranged on an upper rear side with respect to the conveying roller pair 25. The flap 9 is configured to rotate between an discharge position (indicated by solid line) at which the flap 9 opens the conveying passage R1 while closes the re-conveying passage R2, and a re-conveyance position (indicated by phantom lines) at which the flap 9 closes the conveying passage R1 while opens the re-conveying passage R2.

Figure 3:
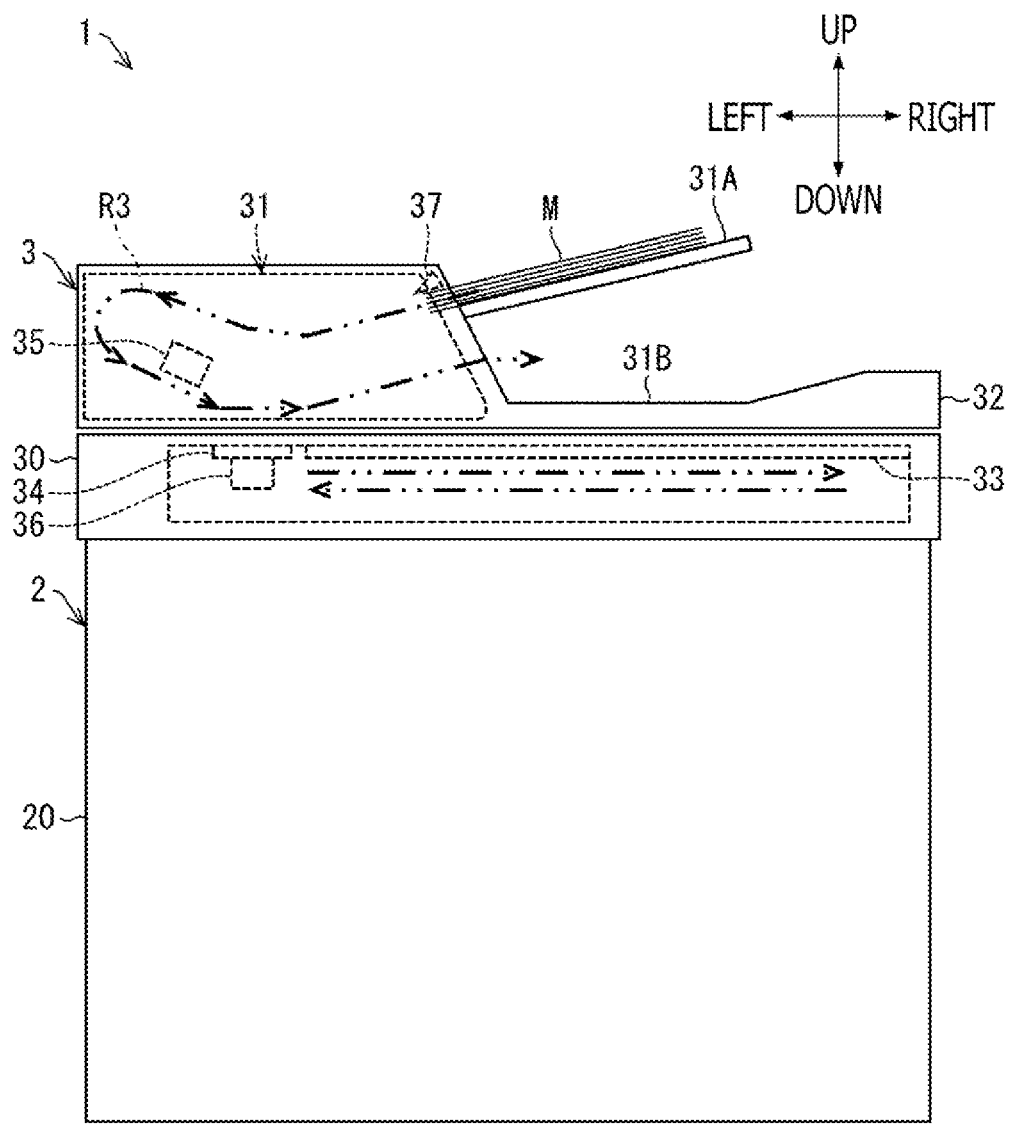
FIG. 3 is a cross-sectional side view showing an internal configuration of a scanner of the MFP.

Next, an internal configuration of the scanner 3 will be described with reference to FIG. 3 as well as FIG. 1. FIG. 3 is a cross-sectional side view showing the internal configuration of the scanner 3. As shown in FIGS. 1 and 3, the scanner 3 has a housing 30, the original document conveyer 31 and an original document cover 32.

The original document conveyer 31 includes an ADF (Auto Document Feeder). The ADF includes a conveying roller configured to convey the original document. The original document conveyer 31 is integrally arranged on the original document cover 32 and is configured to convey the original document M placed on the original document tray 31A toward a first reading sensor assembly 35 and a second reading sensor assembly 36. The original document M is placed on the original document tray 31A in a face-up state. The first reading sensor assembly 35 includes a CIS (contact image sensor). The second reading sensor assembly 36 includes a CIS (contact image sensor). Each of the CISs included in the first reading sensor assembly 35 and the second reading sensor assembly 36 is provided with a light source, a light guide, a rod lens array, and a photoelectric converter (not shown in figures).

The original document cover 32 is rotatably provided to the housing 30 and is configured to open/close an upper surface of the housing 30. It is noted that the scanner 3 may be configured to read both color and monochrome images or only monochrome images.

On the upper surface of the housing 30, a first contact glass 33 and a second contact glass 34 are arranged along a width direction (i.e., a right-left direction). Inside the original document cover 32, the first reading sensor assembly 35 is arranged. Inside the housing 30, the second reading sensor assembly 36 is arranged in such a manner that the second reading sensor assembly 36 is movable in the width direction (i.e., the right-left direction, or a sub-scanning direction) below the first contact glass 33 and the second contact glass 34. The first reading sensor assembly 35 is a sensor configured to read one side of the original document M, while the second reading sensor assembly 36 is a sensor configured to read the other side of the original document M.

Each of the first reading sensor assembly 35 and the second reading sensor assembly 36 is, for example, a CIS (contact image sensor). After the images are read by the first reading sensor assembly 35 and the second reading sensor assembly 36, the original document M is conveyed along a conveying passage R3 by the original document conveyer 31, and discharged onto a sheet discharge tray 31B. The conveying passage R3 extends from the original document tray 31A to a left end part of the original document cover 32 and further extends with being curved downward to the sheet discharge tray 31B.

The MFP 1 according to the present embodiment is assumed to read images of a plurality of sheets of the original document M in accordance with the ADF method. The first reading sensor assembly 35 is configured to read the back side of the original document M conveyed by the original document conveyer 31 along the conveying passage R3. The second reading sensor assembly 36 is configured to read the front side of the original document M conveyed by the original document conveyer 31 along the conveying passage R3.

A front sensor 37 is located at the upstream end of the conveying passage R3. The front sensor 37 is a sensor configured to detect whether there is an original document M in the original document tray 31A.

Figure 4:
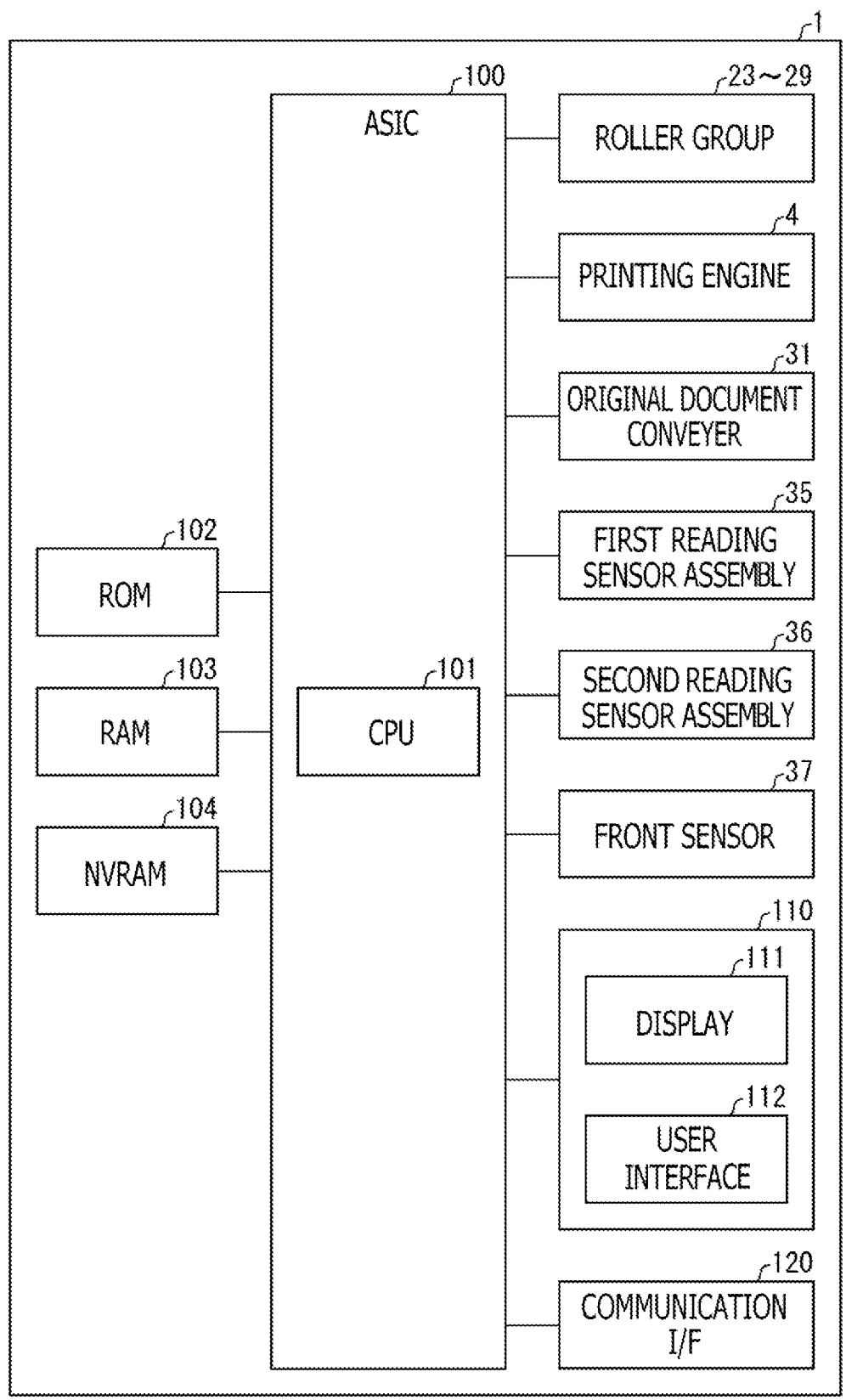
FIG. 4 is a block diagram showing an electrical configuration of the MFP.

FIG. 4 is a block diagram showing an electrical configuration of the MFP 1. As shown in FIG. 4, the MFP 1 is further provided with an ASIC (application specific integrated circuit) 100, a ROM (read only memory) 102, a RAM (random access memory) 103, an NVRAM (non-volatile random access memory) 104, and a communication I/F (interface) 120.

The ASIC 100 is equipped with the CPU 101. The CPU 101 is an example of a controller according to aspects of the present disclosures, and is configured to perform overall control of respective components of the MFP 1. The ASIC 100 is electrically connected to the ROM 102, the RAM 103, the NVRAM 104, the roller groups 23-29, the printing engine 4, the original document conveyer 31, the first reading sensor assembly 35, the second reading sensor assembly 36, the front sensor 37, the operation panel 110 and the communication I/F 0120. It is noted that the ASIC 100 is used as the controller.

In the ROM 102, various control programs and various settings to control the MFP 1 are stored. The RAM 102 is used as a work area in which the programs are retrieved, and a storage area to temporarily store image data, raster data and the like. The NVRAM 104 a storage in which various data has been stored in advance. The CPU 101 is configured to control the roller groups 23-29, the printing engine 4, the original document conveyer 31 and the like based on the control programs retrieved from the ROM 102.

The CPU 101 is configured to drive, via a well-known motor, the sheet feed roller 23, the registration roller pair 24, the conveying roller pairs 25 and 26, the discharging roller pair 27, the reversing roller pairs 28 and 29.

The first reading sensor assembly 35 and the second reading sensor assembly 36 are configured to output the scan data representing the scanned image as read (scanned) to the CPU 101. The front sensor 37 output an ON signal to the CPU 101 when there exists an original document M on the original document tray 31A, while output an OFF signal to the CPU 101 when there exists no original document on the original document tray 31A.

The CPU 101 controls display on the display 111 of the operation panel 110. Further, when the user interface 112 is operated by the user, the CPU 101 performs various processes in accordance with operated contents of the user interface 112.

The communication I/F 120 is connected to a network such as a LAN to enable connection with an external device in which a driver for the MFP 1 has been implemented. The MFP 1 is configured to receive a start command to start a printing process through the communication I/F 120.

Figure 5A:
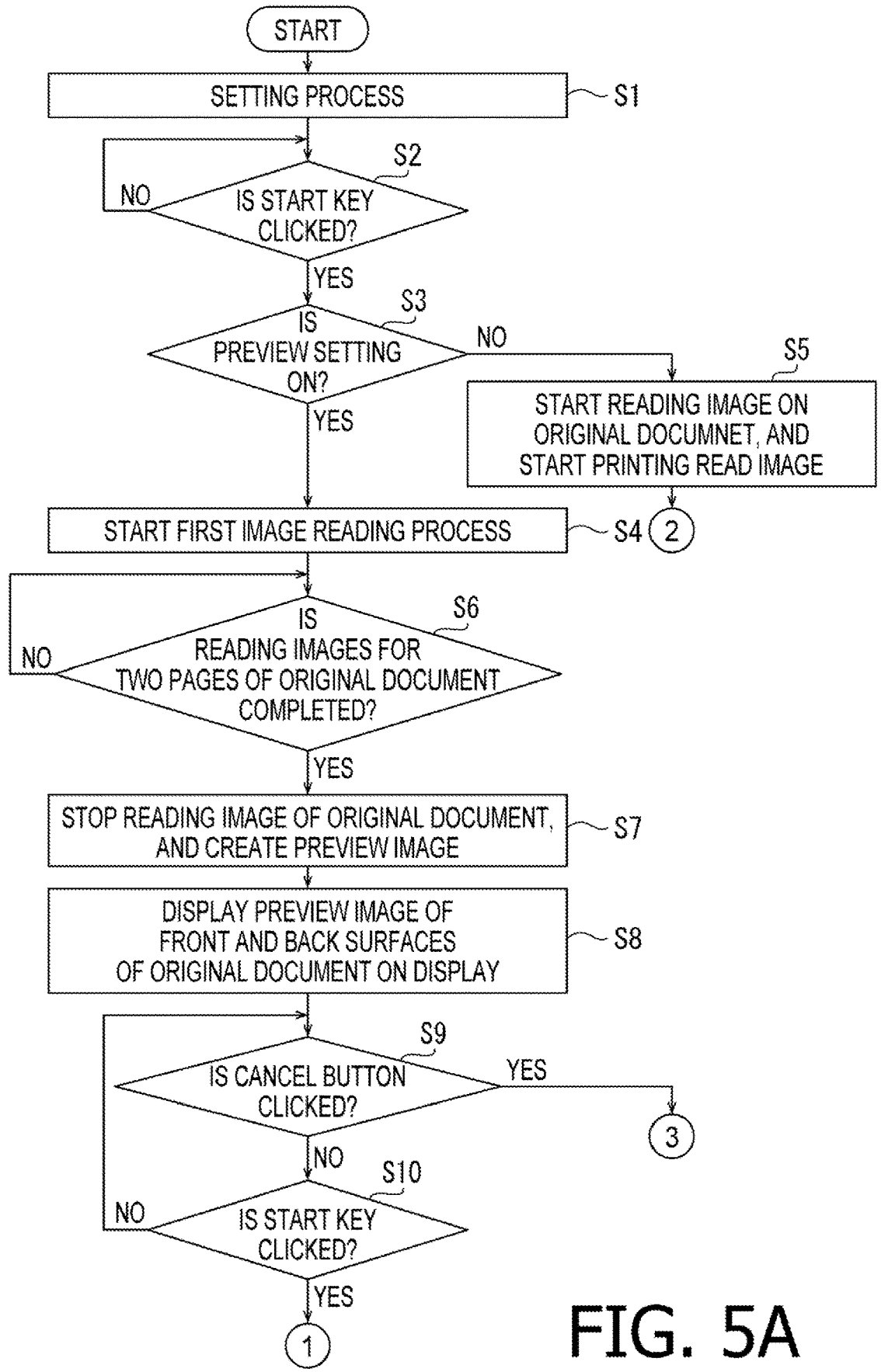
FIGS. 5A and 5B are a flowchart illustrating a printing process according to the embodiment.
Figure 5B:
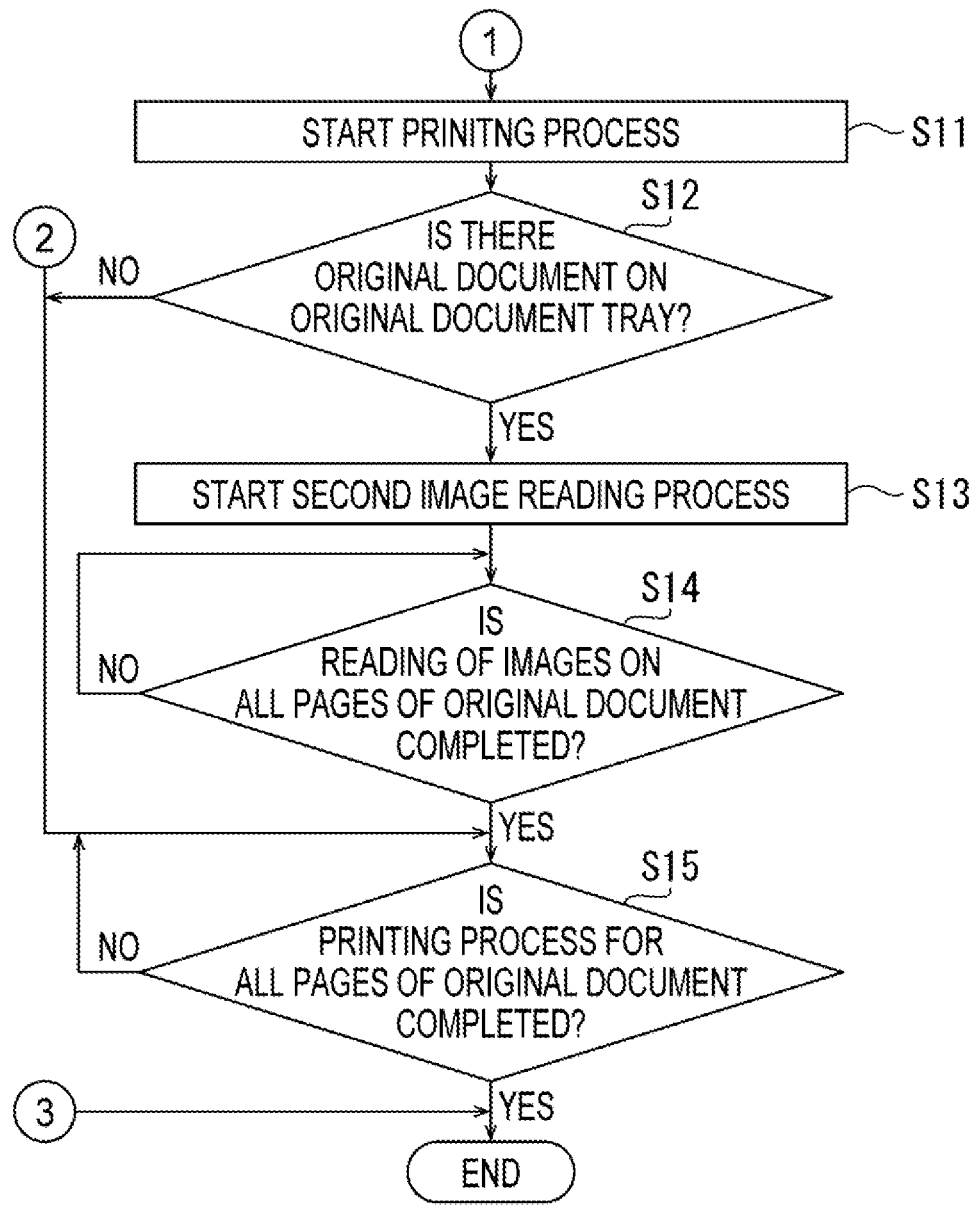

Hereinafter, a control flow when the printing is performed by the CPU 101 will be described with reference to FIGS. 5A-7. FIGS. 5A and 5B is a flowchart illustrating a control flow when the MFP 1 performs the printing. According to the embodiment, a case in which a printing condition to read an image of one side of an original document M is read with the second reading sensor assembly 36 and the scanned image as read is to be printed on both sides of the sheet P is set is described.

Figure 6A:
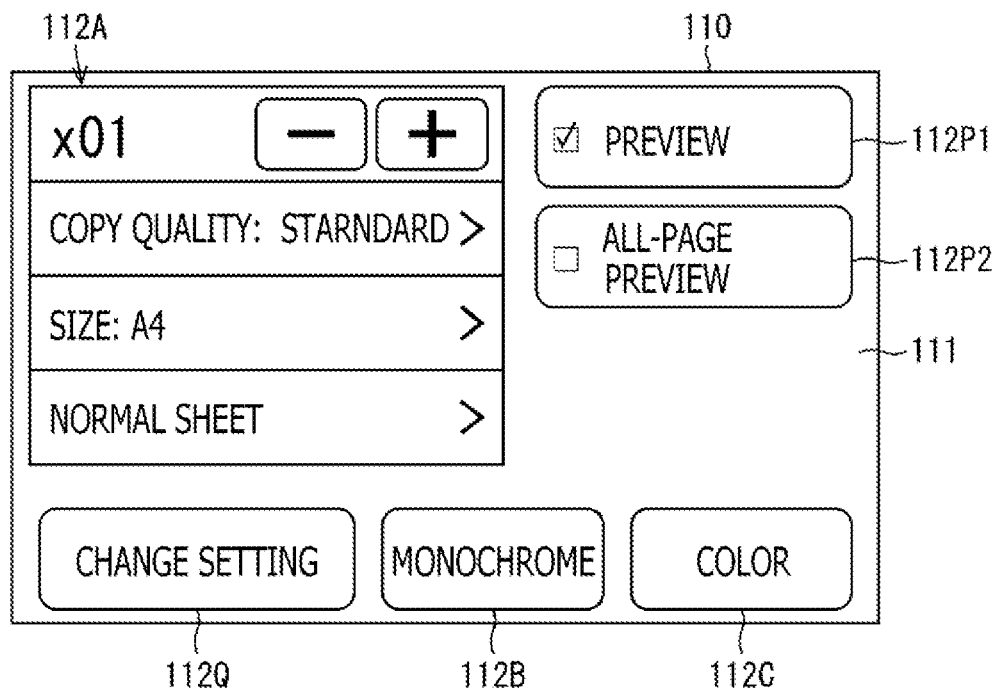
FIGS. 6A and 6B show transition of a displayed screen on an operation panel of the MFP.
Figure 6B:
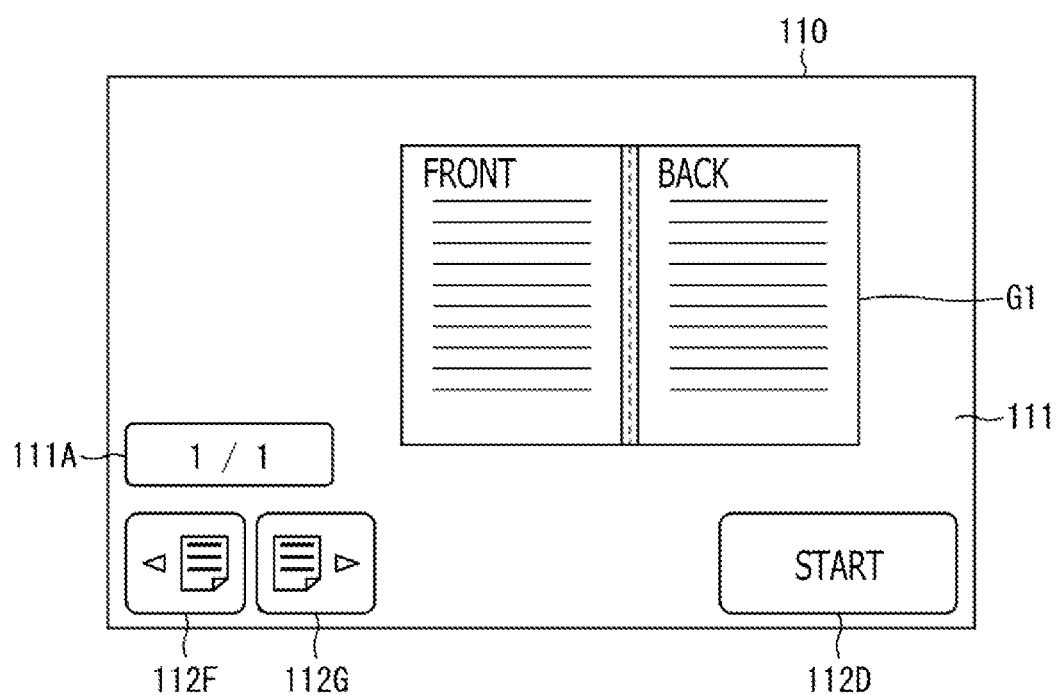
Figure 7:
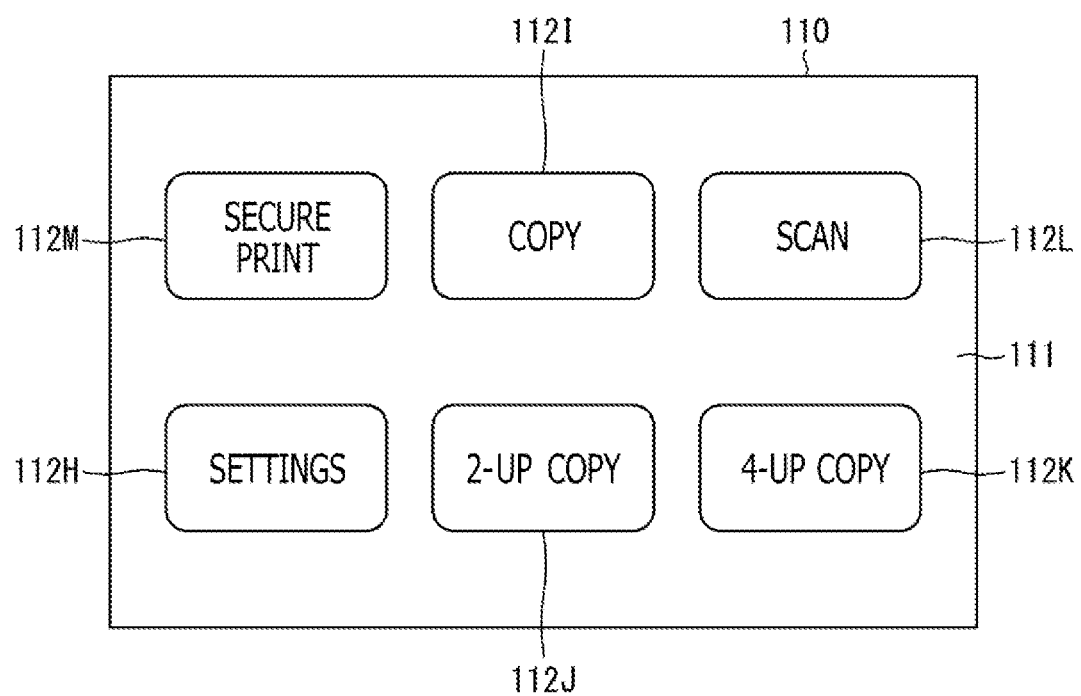
FIG. 7 shows a setting screen to be displayed on the operation panel of the MFP.

In the flowchart shown in FIGS. 5A and 5B, firstly, the CPU 101 executes a setting process to receive various setting regarding the printing (S1). FIGS. 6A and 6B show transition of a screen displayed on the display 111 of the operation panel 110. As shown in FIG. 6A, the user can perform various settings related to the printing by operating respective keys of the user interface 112.

For example, by operating the print setting key 112A, the user can set the printing condition in printing images on the sheet P. For another example, by operating a setting change key 112Q, the user can perform a setting of a reading condition in reading the original document M. For further example, the user can perform a preview setting in displaying the preview image on the display 111 by selecting a preview key 112P1 or an all-page preview key 112P2.

Concretely, when the preview key 112P1 is selected and a "one-page preview setting" is input, the MFP 1 reads images of the original document M by an amount to be printed on one sheet P and displays the same on the display 111 as a preview image for one page.

When the all-page preview key 112P2 is selected and an "all-page preview setting" is input, the MFP 1 reads images of all the pages of a plurality of original documents M and displays the preview images for all the pages on the display 111 one by one.

It is noted that the "preview image" is an arbitrary image corresponding to the scanned image. The preview image is, for example, an image that shows a scanned image printed on the sheet P, that is, an image showing the scanned image being arranged within a particular area of the sheet P.

After execution of S1, the CPU 101 determines whether a start key (monochrome key) 112B or a start key (color key) 112C is clicked (S2). The start key (monochrome key) 112B is to be clicked when a monochromatic copying is to be executed, while the start key (color key) 112C is to be clicked when a color copying is to be executed.

The CPU 101 repeatedly executes S2 until the start key 112B or the start key 112C (S2: NO). When the start key 112B or the start key 112C is clicked (S2: YES), the CPU 101 determines whether the preview setting is ON or not (S3).

When the preview key 112P1 is clicked and the "one-page preview setting" is ON (S3: YES), the CPU 101 starts a first image reading process (S4). Concretely, in S4, the CPU 101 conveys the original document M necessary for images to be printed on one sheet P from the original document tray 31A to the second reading sensor assembly 36 with the original document conveyer 31.

It is noted that, when, for example, images are to be printed on both sides of the sheet P, "the number of sheets of the original document M necessary for images to be printed on one sheet P" is two. Therefore, in such a case, the original documents M for two pages are conveyed to the second reading sensor assembly 36. Then, after the original document M for the two pages has been read with the second reading sensor assembly 36, the CPU 101 stops conveying the original document M with the original document conveyer 31.

On the other hand, when the preview setting is OFF (S3: NO), the CPU 101 conveys the original document M placed on the original document tray 31A to the second reading sensor assembly 36 with the original document conveyer 31. Further, the CPU 101 controls the second reading sensor assembly 36 to read an image on one side of the conveyed original document M and starts printing the read image with the printing engine (S5), and then proceeds to S15.

After executing S4, the CPU 101 determines whether the reading of the images for two pages of the original document M with the second reading sensor assembly 36 has been completed (S6). When the reading of the images for two pages of the original document M has not been completed (S6: NO), the CPU 101 repeatedly executes S6. When the reading of the images for two pages of the original document M has been completed (S6: YES), the CPU 101 stops reading the original document M with the second reading sensor assembly 36, and creates a preview image showing a state in which the images for two pages of original document M are printed on the sheet P (S7).

After executing S7, the CPU 101 transitions the screen displayed on the display 111 from one shown in FIG. 6A to another one shown in FIG. 6B, thereby displaying a preview image G1 showing front and back sides of the original document M on the display 111 (S8). Then, by checking the preview image G1 displayed on the display 111, the user determines whether the printing condition is appropriate.

When the user determines that the printing condition is appropriate, the user clicks the start key 112D. When the user determines that the printing condition is inappropriate, the user clicks the cancel button 112E. If the preview image G1 has multiple pages, the user operates a return key 112F and the forward key 112G to determine whether the printing condition (printing condition) is appropriate or not, while checking the number of pages in the preview image G2 displayed on a page number display screen 111A.

After executing S8, the CPU 101 determines whether the cancel button 112E has been clicked (S9, which is an example of third determining process). When the cancel button 112E has been clicked (S9: YES), the CPU 101 determines that a cancel instruction to cancel the printing process is received, transitions the screen displayed on the display 111 to a setting screen shown in FIG. 7. In this case, the CPU 101 does not execute the second image reading process (S13) or the printing process (S11). By clicking a "SETTINGS" key 112H, a "COPY" key 112I, a "2-UP COPY" key 112J, a "4-UP COPY" key 112K, a "SCAN" key 112L, and a "SECURE PRINT" key 112M on the setting screen shown in FIG. 7, the user can make various setting regarding the printing.

When the cancel button 112E has not been clicked (S9: NO), the CPU 101 determines whether the start key 112D has been clicked (S10). On the other hand, when the cancel button 112E has not been clicked (S9: NO), the CPU 101 determines whether the start key 112D has been clicked (S10). When the start key 112D has not been clicked (S10: NO), the CPU 101 returns to S9. When the start key 112D has been clicked (S10: YES), and the printing instruction has been input, the CPU 101 starts the printing process (S11).

Concretely, in S11, the CPU 101 converts the scan data representing the scanned image read by the second reading sensor assembly 36 into raster data. Further, the CPU 101 feeds, with the sheet feed roller 23, a sheet P into the conveying passage R1, and conveys, with the registration roller pair 24, the sheet P toward the printing engine 4.

Next, after printing, with the printing engine 4, an image represented by the raster data on a front side of the sheet P, the CPU 101 conveys the sheet P, on which the image represented by the raster data was printed, to the re-conveying passage R2. Thereafter, the CPU 101 reverse the conveying direction of the sheet P with the reversing roller pairs 28 and 29 and conveys the sheet P downward to the conveying passage R1 again. After printing, with the printing engine 4, an image represented by the raster data on a back side of the sheet P, the CPU 101 discharges the sheet P, on both sides of which the images were printed, on the sheet discharge tray 22.

Next, the CPU 101 determines whether there is an original document M on the original document tray 31A based on a detection result of the front sensor 37 (S12). When the front sensor 37 outputs the "ON" signal, the CPU 101 determines there exists an original document M on the original document tray 31A (S12: YES), and starts the second image reading process (S13). Concretely, in S13, the CPU 101 conveys, with the original document conveyer 31, an original document M subsequent to the original document M having been read in the first image reading process (S4), and reads an image on the conveyed original document M with the second reading sensor assembly 36.

On the other hand, when the front sensor 37 outputs the "OFF" signal, the CPU 101 determines that there exists no original document M on the original document tray 31A (S12: NO), the proceeds to S15.

Next, the CPU 101 determines whether all the pages of the original document M have been read (S14). Until the reading of all the pages of the original document M is completed (S14: NO), the CPU 101 repeatedly executes S14. After the reading of all the pages of the original document M is completed (S14: YES), the CPU 101 proceeds to S15.

In S15, the CPU 101 determines whether the printing process for all the pages of the original document M has been completed. Until the printing process for all the pages of the original document M is completed (S15: NO), the CPU 101 repeatedly executes S15. When the printing process for all the pages of the original document M has been completed (S15: YES), the CPU 101 terminates the flow shown in FIGS. 5A and 5B.

According to the MFP 1 described above, when, for example, reading images of 20 sheets of original document M and printing the same with a duplex printing, not after all the images of the original document M area scanned, but only after first two images of the original document M are scanned (S6: YES), the preview image G1 is displayed on the display 111 (S8). By visually recognizing the preview image for the first two pages at a time, the user can determine whether the printing would be performed with an appropriate printing condition (e.g., a printing layout and the like) promptly. Therefore, when the printing condition is inappropriate, re-reading of the original document M can be performed immediately, thereby a time period until re-reading of the original document M being shortened.

Further, the user can select whether or not the preview display is performed through the user interface 112 in the setting process (S1), availability of the preview display can be set in accordance with the user's request.

Furthermore, by checking the preview image displayed in the preview displaying process (S8), the user can determine whether the currently set printing condition is appropriate. If the user notices that the printing condition is inappropriate, by clicking the cancel button 112E (S9: YES) to cancel the printing process (S11). Such a configuration enables the user to redo the reading of the original document M earlier.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The MFP 1 according to the above-described embodiment, when the preview setting is "ON" in the flowchart shown in FIGS. 5A and 5B, a preview image G1 for two pages of original document M are displayed on the display 111 as shown in FIG. 6. It is noted that the configuration is not necessarily limited to the above.

When the all-page preview key 112P2 is selected in S1 and the "all-page preview setting" has been received (S3: YES), the CPU 101 reads images of all the pages of the original document M on the original document tray 31A with the second reading sensor assembly 36 (S4), and then, displays the preview image showing the front and back of all the pages of the original document M on the display 111 for every two pages.

As above, by selecting the preview key 112P1 or the all-page preview key 112P2, the user can select whether a preview image for one page is displayed or preview images for all the pages are displayed on a page basis, as needed.

Figure 8A:
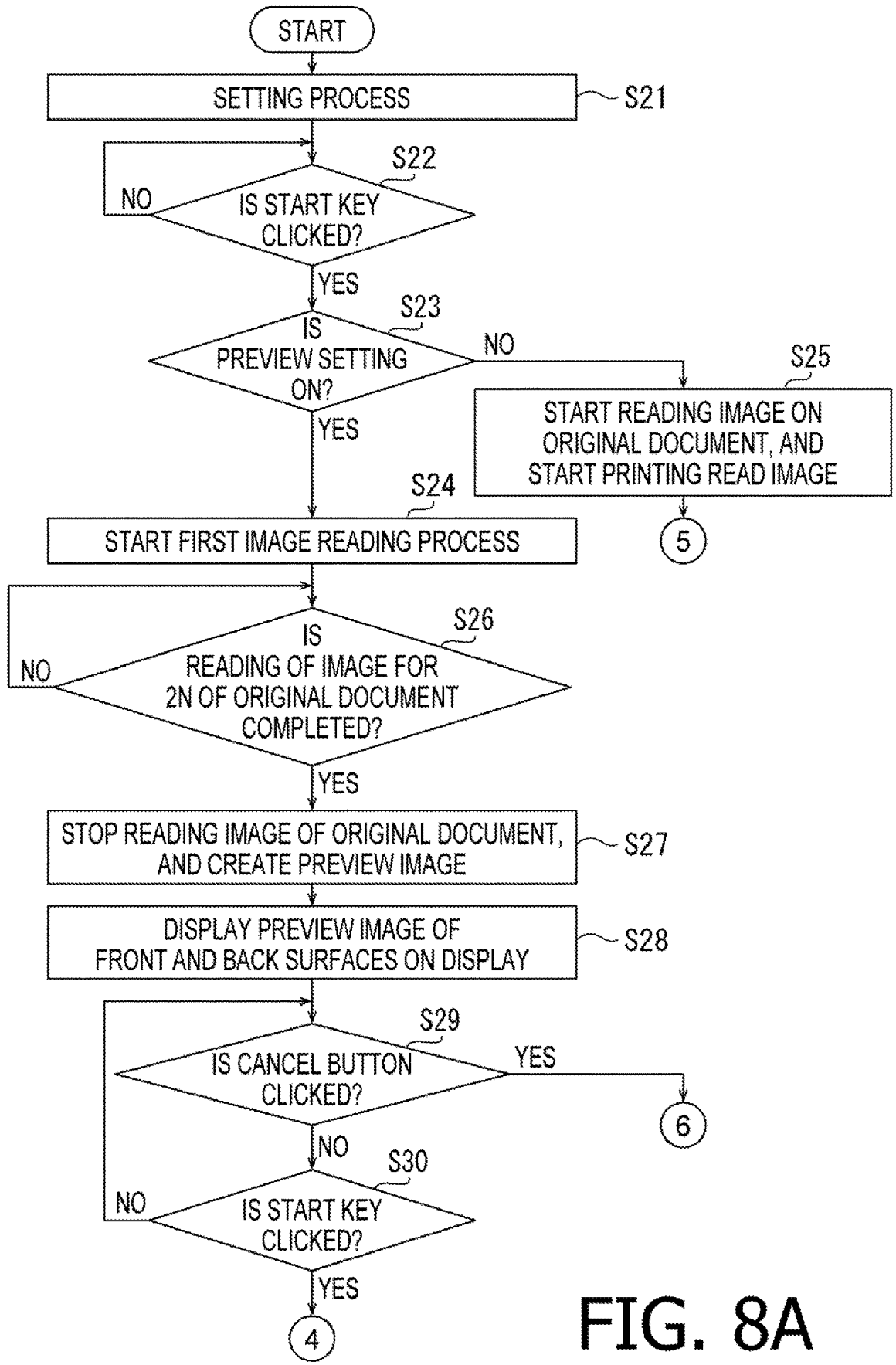
FIGS. 8A and 8B are a flowchart illustrating a printing process according to a modified embodiment.
Figure 8B:
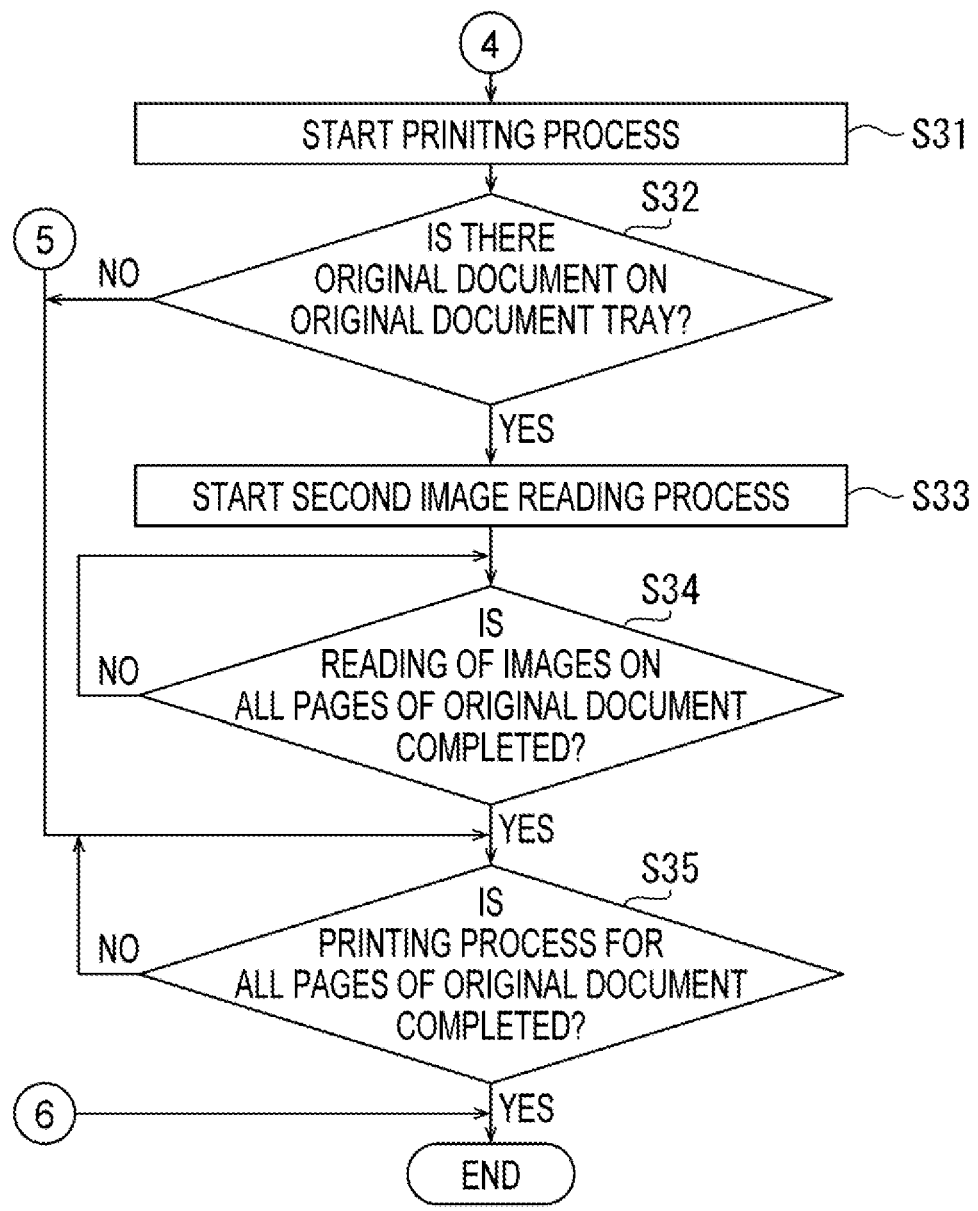

Next, the MFP 1 according to a modification of the above-described embodiment will be described with reference to FIGS. 8-10. FIGS. 8A and 8B is a flowchart showing a control flow of the MFP 1 when the printing is performed. For the brevity, elements/components/members having the same functions of those described in the above embodiment are assigned with the same reference numerals and descriptions thereof will not be repeated.

According to the present modification, it is assumed that, as the printing condition, the preview setting is set to "ON" and images on the both sides of the original document M are read and then printed on the both sides of the sheet P in a N-UP format (e.g., N=4). According to the present modification, N is assumed to be four. The user can perform a 4-UP print setting by clicking the "4-UP COPY" key 112K on the display screen shown in FIG. 7.

In the flowchart shown in FIGS. 8A and 8B, the CPU 101 performs the setting process (S21) as in S1. After executing S1, the CPU 101 determines whether the start key 112D has been clicked (S22), and until the start key 112D is clicked (S22: NO), repeatedly executes S22. When the start key 112D is clicked (S22: YES), the CPU 101 determines whether the preview setting is ON (S23).

As shown in FIG. 6A, when the preview key 112P1 is selected and the preview setting is "ON" (S23: YES), the CPU 101 starts the first image reading process (S24). Concretely, S24, the CPU 101 conveys, with the original document conveyer 31, four sheets of original document M from the original document tray 31A to the first reading sensor assembly 35 and the second reading sensor assembly 36, which serve as a sensor assembly.

Then, the CPU 101 reads images of both sides of the four sheets of original document M as conveyed with the first reading sensor assembly 35 and the second reading sensor assembly 36. Thereafter, the CPU 101 stops conveyance of the original document M with the original document conveyer 31.

On the other hand, when the preview setting is "OFF" (S23: NO), the CPU 101 conveys the original document M placed on the original document tray 31A to the first reading sensor assembly 35 and the second reading sensor assembly 36 with the original document conveyer 31, causes the first reading sensor assembly 35 and the second reading sensor assembly 36 to read images on both sides of the conveyed original document M, and starts printing the read images on both sides of the sheet P with the printing engine 4 (S25), and proceeds to S35.

After executing S24, the CPU 10 determines whether the reading of the original document M by an amount of 2N pages (i.e., eight pages, in this example) with the first reading sensor assembly 35 and the second reading sensor assembly 36 has been completed (S26). Until the reading of 2N pages of the original document M is completed (S26: NO), the CPU 101 repeatedly executes S26. When the reading of 2N pages of the original document M has been completed (S26: YES), the CPU 101 stops the reading of the original document M with the first reading sensor assembly 35 and the second reading sensor assembly 36, and generates preview images showing a state in which eight pages of original document M are printed on both sides of the sheet P (S27).

Figure 9:
FIG. 9 shows examples of a layout according to the modified embodiment.

FIG. 9 shows an example of print layouts available on the MFP 1. FIG. 10 shows an example of a screen displayed on the display 111 of the operation panel 110 of the MFP 1. After executing S27, the CPU 101 displays a preview image G2 showing a result of printing on both sides of the sheet P, on a page basis, on the display 111 as shown in FIG. 10 (S28).

Figure 10:
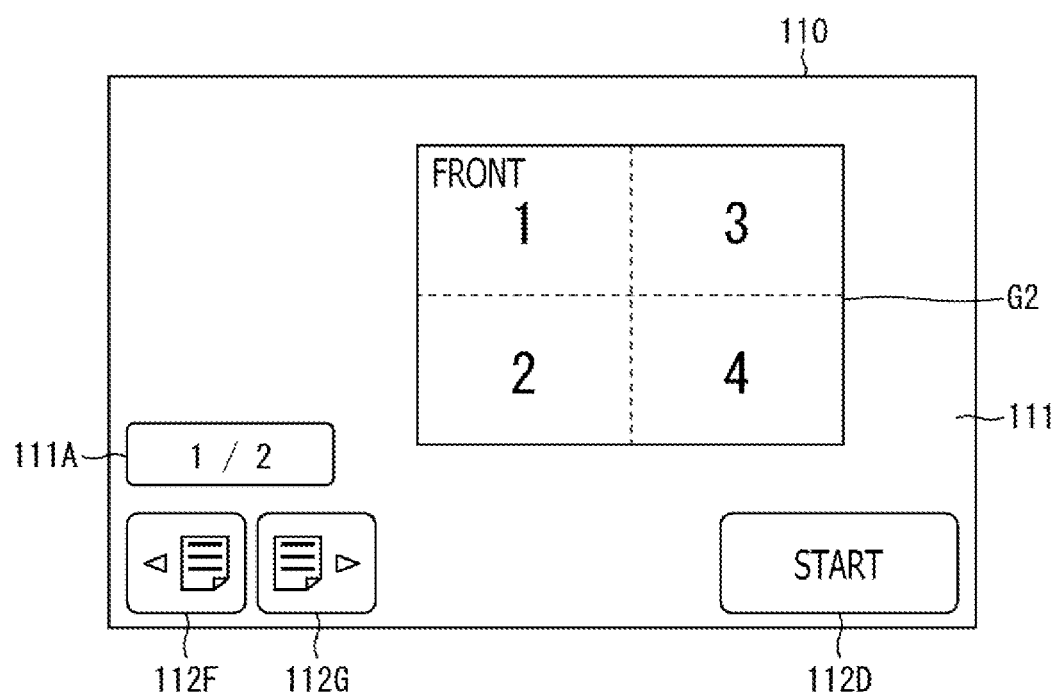
FIG. 10 shows an example of a screen displayed on the operation panel of the MFP according to the modified embodiment.

In this example shown in FIG. 10, the print layout is set to 4-UP (horizontal) and duplex printing (long edge binding) as shown in FIG. 9. In a state shown in FIG. 10, when the user wants to check the preview image for the back side of the sheet P, the user may click the forward key 112G, and when the user wants to check the preview image G2 for the front side of the sheet P, the user may click the return key 112F.

After executing S28, the CPU 101 determines whether the cancel button 112E has been clicked (S29, which is a third determining process). When the cancel button 112E has been clicked (S29: YES), the CPU 101 determines that a cancel instruction has been received, and terminates the flow shown in FIGS. 8A and 8B without performing the second reading process (S33) or the printing process (S31).

When the cancel button 112E has not been clicked (S29: NO), the CPU 101 determines whether the start key 112D has been clicked (S30). When the start key 112D has not been clicked (S30: NO), the CPU 101 returns to S29, while when the start key 112D has been clicked (S30: YES) and the print instruction has been received, the CPU 101 start the printing process (S31).

Concretely, the CPU 101 prints, as in S11, images of 8 pages read by the first reading sensor assembly 35 and the second reading sensor assembly 36 in S31 on both sides of the sheet P.

Next, the CPU 101 determines, as in S12, whether there exists an original document M on the original document tray 31A (S32). When the front sensor 37 outputs the "ON" signal, the CPU 101 determines that there exists the original document M on the original document tray 31A (S32: YES), and starts the second image reading process (S33). Concretely, in S33, the CPU 101 conveys an original document M subsequent to the original document M read in the first reading process (S4) with the original document conveyer 31, and reads images of the conveyed original document M with the first reading sensor assembly 35 and the second reading sensor assembly 36.

On the other hand, when the front sensor 37 outputs the "OFF" signal, the CPU 101 determines that the conveyance of all the original documents M has been completed and there exists no original document M on the original document tray 31A (S32: NO), the CPU 101 proceeds to S35.

Next, the CPU 101 determines whether the reading of all the pages of the original document M has been completed (S34). Until the reading of all the pages of the original document M is completed (S34: NO), the CPU 101 repeatedly executes S34. When the reading of all the original document M has been completed (S34: YES), the CPU 101 proceeds to S35.

In S35, the CPU 101 determines whether the printing process for all the pages of the original document M has been completed. Until the printing of all the pages of the original document M is completed, the CPU 101 repeatedly executes S35. When the printing process of all the pages of the original document M (S35: YES), the CPU 101 terminates the flow shown in FIGS. 8A and 8B.

In the MFP 1 according to the modification, when the N-UP printing (e.g., N=4) and the duplex printing are set, the preview image G2 showing a state where images of 8 pages of the original document M are printed on both pages of the sheet P are displayed on the display 111. Therefore, the user can check images of eight pages of original document M at a time, and determine whether the printing would be performed with an appropriate printing condition promptly. That is, as shown in FIG. 9, whether the printing can be performed with a desired printing layout when multiple patterns of printing layout are available can be determined by checking the preview image the re-conveying passage R2 G2 corresponding to a minimum reading number of original document M.

In the MFP 1 according to the modification described above, it is assumed that the printing condition contains the settings of the N-UP printing (e.g., N=4) and the duplex printing. However, according to another modification, the printing condition may contain the settings of the N-UP printing and the simplex printing.

Also in the MFP 1 according to the other modification, when the N-UP printing is set, a preview image showing a state where images of N pages of the original document M are printed on one side of the sheet P is displayed on the display 111, the user can check images of two or more pages of original document M at a time, and determines whether the printing would be performed with an appropriate printing condition promptly.

In the above-described modification, a case of 4-UP printing is described. However, the setting is not necessarily limited to the 4-UP printing, but the print setting may be the 2-UP printing, a 6-UP printing, or the like.

In the MFP 1 according to the above-described embodiment, the sheet P is assumed to be the normal sheet. However, the type of the sheet P is not necessarily limited to the normal sheet, but the sheet P can be a thick sheet or a thin sheet. Further, in the above-described embodiment, the fixing device 5 is configured in such a manner that the developer image is fixed to the sheet P with the heat roller 51 having a roller member. However, the fixing device 5 is not necessarily limited to have such a configuration. For example, instead of the heat roller 51, a heating belt may be used.

Control blocks of the MFP 1 (especially the CPU 101) may be realized by logic circuits (i.e., hardware) formed in integrated circuits (e.g., IC chips) and the like, or may be realized by software.

In the latter case (i.e., in a case where the control blocks of the MFP 1 is be realized by software), the MFP 1 is equipped with a computer that executes the instructions of a program, which is software that implements each function. The computer is equipped with one or more processors, for example, and a computer-readable recording medium storing the above program (i.e., computer-executable instructions). Then, in the above computer, the above processor reads the above program from the above recording medium and executes the same, thereby achieving the processes described above.

As the processor, for example, a CPU (central processing unit) can be used. As the recording medium, a "non-transitory tangible medium" such as a ROM (read only memory), a tape, a disk, a card, a semiconductor memory, a programmable logic circuit or the like can be used. The recording medium further includes a RAM (random access memory) in which the program can be developed.

The above program may be supplied to the computer via any transmission medium (e.g., a communication network, a broadcast wave, and the like) capable of transmitting the program. One aspect of the present disclosures can also be realized in the form of a data signal embedded in a carrier wave, in which the above program is embodied by electronic transmission.

Aspects of the present disclosures are not necessarily limited to the above-described embodiment/modifications, and various changes are possible within the scope of the claims, and embodiment/modifications obtained by combining technical means disclosed respectively in the different embodiment/modifications as appropriate are also included in the technical scope of the present disclosures.

What is claimed is:

1. A printing apparatus, comprising:
   an original document tray on which original documents are to be placed;
   a sensor assembly configured to read an image of the original documents;
   an original document conveyer having a sheet conveying roller configured to convey the original documents placed on the original document tray toward the sensor assembly;

a printing engine configured to print an image read by the sensor assembly on a sheet;
a display;
a user interface; and
a controller,
wherein, when printing on multiple sheets, the controller is configured to perform
causing the original document conveyer to convey a necessary number of the original documents for printing on a single sheet of the multiple sheets from the original document tray to the sensor assembly,
causing the sensor assembly to read images on the conveyed original documents for printing on the single sheet,
causing the original document conveyer to terminate conveyance of the original documents with the original document conveyer after the sensor assembly has read the in for printing on the single sheet,
generating a preview image of the single sheets, the preview image of the single sheets showing a state where the image read by the sensor assembly for printing on the single sheet are printed on the single sheet,
displaying the preview image on the display, and
in response to receipt of a print instruction through the user interface after displaying the preview mage of the single sheet,
conveying a remaining original document subsequent to the original documents for printing on the single sheet, the remaining original document being a document for printing on remaining sheets of the multiple sheets,
causing the sensor assembly to read an image on the conveyed remaining original document, and
causing the printing engine to print the images read from the original documents for printing on the single sheets and the image read from the conveyed remaining original document on the multiple sheets.

2. The printing apparatus according to claim 1, wherein the controller is further configured to perform:
receiving, through the operation device, a setting of whether to perform the preview displaying;
when receiving the setting to perform the preview displaying reading images on the original documents for printing on one sheet with the sensor assembly and displaying the preview image on the display in the preview displaying; and
when not receiving the setting to perform the preview displaying reading images on the original documents for printing on one sheet with the sensor assembly and not performing the preview displaying.

3. The printing apparatus according to claim 2, wherein the controller is further configured to perform:
receiving a setting selecting one of a one-page preview and an all-page preview setting through the operation device;
when receiving the setting selecting the one-page preview, reading, with the sensor assembly, images on the original documents for printing on one sheet, and displaying, on the display, the preview image for the one sheet in the preview displaying; and
when receiving the setting selecting the all-page preview, reading, with the sensor assembly, all images on a plurality of the original documents, and displaying, on the display, the preview image for the all images in the preview displaying.

4. The printing apparatus according to claim 1, wherein the controller is further configured to perform:
receiving a setting of a printing condition through the operation device; and
when receiving the setting of a printing condition for N-up printing to print images of N pages of the original documents on one sheet, N being an integer greater than or equal to 2
reading images on N pages of the original documents with the sensor assembly, and
displaying, on the display, the preview image showing a state where the images of N pages of the original documents are printed on the sheets in the preview displaying.

5. The printing apparatus according to claim 4, wherein the controller is further configured to perform:
receiving a setting of a printing condition through the operation device; and
when receiving the setting of the printing condition for the N-up printing and a duplex printing
reading images on 2N pages of the original documents with the sensor assembly,
in the preview displaying, displaying, on the display, the preview image showing a state where the print images of two pages of the original documents are printed on both sides of the sheet, and
in the printing, printing the images read by the sensor assembly on both sides of the sheet with the printing engine.

6. The printing apparatus according to claim 1, wherein the controller is further configured to perform:
receiving a setting of a printing condition through the operation device;
when receiving the setting of the printing condition for a simplex printing, reading images on one page of the original documents with the sensor assembly, and when receiving the setting of the printing condition for a duplex printing, reading images on two pages of the original documents with the sensor assembly;
in the preview displaying, when receiving the setting of the printing condition for the simplex printing, displaying, on the display, the preview image showing a state where the images of one page of the original documents is printed on one side of the sheet, and, when receiving the setting of the printing condition for the duplex printing, displaying, on the display, the preview image showing a state where the images of two pages of the original documents are printed on both sides of the sheet; and
in the printing, when receiving the setting of the printing condition for the simplex printing, printing the images read by the sensor assembly on one side of the sheet with the printing engine, and when receiving the setting of the printing condition for the duplex printing, printing the images read by the sensor assembly on both sides of the sheet with the printing engine.

7. The printing apparatus according to claim 1, wherein the controller is further configured to, after performing the preview, determine whether a cancel instruction is received to cancel the printing through the operation device; and
wherein, when determining that the cancel instruction is received the controller is configured to not perform the printing.

* * * * *